United States Patent [19]

Norton

[11] Patent Number: 4,504,070
[45] Date of Patent: Mar. 12, 1985

[54] ANTI-CENTRIFUGAL CHUCK

[75] Inventor: Gerald W. Norton, Schoolcraft, Mich.

[73] Assignee: Speedgrip Chuck, Inc., Elkhart, Ind.

[21] Appl. No.: 386,685

[22] Filed: Jun. 9, 1982

[51] Int. Cl.³ .............................................. B23B 31/16
[52] U.S. Cl. .................................... 279/1 C; 279/121
[58] Field of Search ......................... 279/121, 1 C, 110

[56] References Cited

U.S. PATENT DOCUMENTS

| | | | |
|---|---|---|---|
| 3,424,467 | 1/1969 | Buck | 279/121 X |
| 3,494,627 | 2/1970 | Pirman | 279/121 |
| 3,658,353 | 4/1972 | Parsons | 279/121 |
| 3,814,451 | 6/1974 | Röhm | 279/121 |
| 4,078,814 | 3/1978 | Röhm | 279/121 X |
| 4,123,075 | 10/1978 | Rosewarne et al. | 279/121 |
| 4,288,085 | 9/1981 | Antoni | 279/121 |

FOREIGN PATENT DOCUMENTS 1381146  1/1975  United Kingdom ............... 279/121

*Primary Examiner*—William R. Briggs
*Assistant Examiner*—Glenn L. Webb
*Attorney, Agent, or Firm*—Barnes & Thornburg

[57] ABSTRACT

An anti-centrifugal power chuck of the type having a plurality of radially-movable jaws and respective wedge-like actuators associated therewith for the purpose of displacing the jaws into engagement with a workpiece for holding same as the chuck is rotated at high speeds is designed to resist the centrifugal forces which are applied at high rotational speeds to a significantly greater degree than has been previously obtainable and which will reduce problems of binding and wear associated with the use of wedge-type actuators, without compromising strength. In accordance with a preferred embodiment, a single, massive, unitary body member is utilized for both radially-movably supporting and guiding a plurality of gripping jaws and for receiving, within complementarily-shaped bores, the respective wedge-like actuators, which actuators and the actuation system therefor have been modified to operate under compression instead of tension for external gripping of workpieces. Additionally, the wedge members and their respective bores are formed of a substantially circular cylindrical shape for radially and circumferentially distributing circumferential forces imposed on the jaws to the unitary body member.

10 Claims, 3 Drawing Figures

ANTI-CENTRIFUGAL CHUCK

BACKGROUND AND SUMMARY OF THE INVENTION

The present invention is directed to anti-centrifugal power chucks and, in particular, to chucks of the type having a plurality of radially-movable jaws and respective wedge-like actuators associated therewith for the purpose of displacing the jaws into engagement with a workpiece for holding same as the chuck is rotated at high speeds.

As noted in U.S. Pat. No. 4,123,075, of which the present inventor is a co-inventor, a long-standing problem with regard to the use of chucks which rotate at high speeds is the problem of the centrifugal forces that are developed on the jaws of the chuck, which centrifugal forces may significantly change the gripping force applied by the jaws to the workpiece. Furthermore, as also noted in this prior patent, the centrifugal force problem is particularly important with regard to chucks that are used for exteriorly gripping workpieces since it results in a reduction in the force by which the chuck grips the workpiece, and can result in slipping of the workpiece at relatively high rotational speeds.

To avoid this problem without the use of complex levers or other movable mechanisms for balancing the chuck, a sleeve-encased jaw chuck is disclosed in U.S. Pat. No. 4,123,075 which radially-slidably supports the jaw carriers within an inner sleeve-like body and utilizes an outer sleeve-like body (which closely confines the inner body and slidably engages wedge-like actuators) for preventing the centrifugal force imposed on the jaw carriers from causing any substantial reduction in the gripping force.

Additionally, the above-noted patent seeks to avoid another problem which has limited the efficiency of jaw chucks that utilize a cam or wedge structure for displacing the gripping jaws, namely, the problem of friction and wear imposed as a result of substantial twisting or turning moments applied to the jaw carrier. In particular, this is attempted by providing the jaw carrier with a central slot extending radially therethrough that accommodates the forward end of the actuating wedge to permit the force transfer between the jaw carrier and the wedge to occur within the central portion of the jaw carrier. Additionally, the wedge plate is removably mounted on the jaw carrier so as to enable it to be replaced once it has experienced substantial wear without requiring replacement of the complete jaw carrier assembly.

Although a very advantageous construction, the sleeve-encased jaw chuck of U.S. Pat. No. 4,123,075 has not been completely satisfactory in avoiding either of the noted problems for certain operating conditions. Since this chuck is operated by drawing the wedges away from the jaws, so as to pull the jaws radially inward, the wedge members are not backed up, at all times, by the chuck body itself nor any other element, so that the axially-outer, forward end of the jaws have a tendency to twist radially-outwardly away from the workpiece. Additionally, since the wedge members are only supported at a small portion of the outer sleeve-like body, and the outer sleeve-like body is not integral with the inner sleeve-like body, and since the sleeve-like body is relatively thin in the area of contact with the wedge members, the sleeve-like outer body is unable to exert sufficient force to resist the centrifugal forces which are imposed at high speeds. In fact, tests have established that, under certain circumstances, the outer sleeve-like body separates from the inner body under high rotational speeds to form a tri-lobed configuration, and, due to the resulting lack of support, outward movement of the gripping jaws and workpiece slippage.

Similarly, because of the above-noted twisting, resulting from the lack of full support for the jaws as they are brought into engagement with a workpiece due to withdrawal of the wedge members, and due to the rectangular shape of the interengaging portions of the wedge guiding slot and wedge member, the problem of wedge binding and associated wear due to twisting may cause difficulties under certain conditions.

The present invention contemplates providing a jaw-type chuck which will resist the centrifugal forces which are applied at high rotational speeds to a significantly greater degree than has been heretofore possible.

It is another object of the present invention to provide a construction of a multi-jaw chuck which will reduce the problems of binding and wear associated with the use of wedge-type actuators, without compromising strength.

It is another object of the present invention to provide a multi-jaw chuck which will operate satisfactorily for both external and internal gripping of workpieces. In addition to counteracting the effects of centrifugal force which would otherwise tend to release the gripping effect on externally gripped parts the chuck construction also prevents the centrifugal force effects from unduly increasing the gripping of thin walled tubes when it is used for internal gripping of such tubes.

Yet another object of certain aspects of the invention is the provision of a chuck construction which protects against the jaws breaking through the chuck periphery in the event of certain types of machine breakages.

These objects are achieved in accordance with a preferred embodiment of the present invention by integrating the inner and outer sleeve bodies of a chuck of the type shown in U.S. Pat. No. 4,123,075 into a unitary one-piece solid steel body. Furthermore, by modifying the wedge actuation system so as to operate under compression instead of tension for external gripping, greater support for the jaws is provided, and advantage can be taken of the basic fact that chuck construction materials are stronger in compression than they are in tension. Additionally, by utilizing a wedge member of cylindrical design, radial and circumferential support for the wedge member is increased, and problems of wedge binding due to twisting thereof is minimized. That is, while a rectangular slot will provide only a single planar surface to absorb all of the forces imposed radially-outwardly by the jaws and, thus, has a tendency to elongate radially-outwardly, a slot of circular cross-section provides a support surface of greater effective length than a comparable sized rectangular slot and distributes the loads in a variety of circumferential and radial directions. Furthermore, minimal binding can occur due to twisting of a circular cross-sectional solid member within a slot of circular cross-section in comparison to a rectangular solid twisted within a slot of rectangular cross-section.

An additional advantage of the above-noted use of a cylindrical wedge member is that substantial cost savings and simplification of manufacturing processes can be achieved since a cylindrical or part cylindrical hole can be cheaply and easily produced by drilling, particularly in a solid body, while more complicated procedures are required for production of a rectangular slot. Coupled with the reduction in parts achieved by the construction of the present invention relative to that of the prior art, the result is a stronger, and significantly less costly anti-centrifugal chuck which is not prone to the above-discussed problems.

Yet aother advantage of preferred embodiments of the invention is that the firm anti-centrifugal force arrangement protects against overgripping and distortion of internally gripped parts such as thin walled tubes.

A still further advantage of preferred embodiment of the invention is that all master jaw components are completely radially surrounded by the basic chuck body with no radial jaw slots cut through the chuck body periphery. With this arrangement, should any breakage occur internally due to machine wreckage or the like, all internal parts including the master jaws would be captivated within the basic chuck body providing additional operator safety.

These and further objects, features and advantages of the present invention will become more apparent from the following description when taken in connection with the accompanying drawings which show, for purposes of illustration only, a single embodiment in accordance with the present invention.

DETAILED DESCRIPTION OF THE PREFERRED EMBODIMENT

Figure 1:
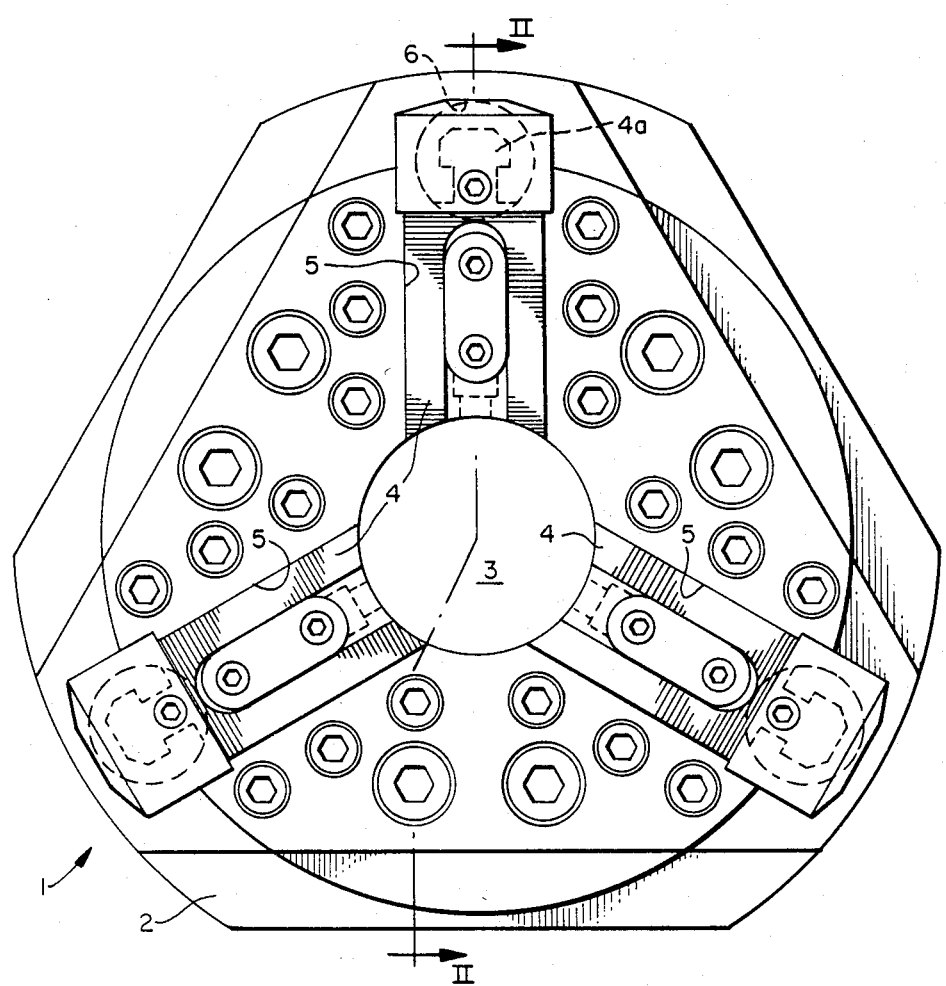
FIG. 1 is a front face view of an anti-centrifugal chuck constructed in accordance with the present invention.

In the following description, like reference numerals are used throughout the several views to designate the same components and, for reference purposes, the term "front" will be used with reference to the exposed face of the chuck having the jaws mounted thereat, while the term "radially inwardly" or "radially outwardly" are relative to the central longitudinal axis of the chuck extending from its front to its rear.

Referring now to the drawings and, in particular, to FIG. 1, the anti-centrifugal chuck is generally designated by the reference numeral 1 and comprises a single, unitary body 2 that is provided with a central through-aperture 3. While not limited to three jaws, in the illustrated preferred embodiment, three radially inwardly and outwardly shiftable jaws 4 are shown, each of which is received within a respective slot 5. A jaw attachment 4', schematically indicated in dashed lines, may be used when internal gripping of work pieces is desired.

Drilled into the body 2 are respective cylindrical bores 6 which respectively adjoin and are connected to slots at their front end. Slidably received within each bore 6 is a wedge member 7 that is cylindrically shaped to slide within the bore 6 forwardly and rearwardly within the chuck body. These bores 6 are positioned radially inwardly of the periphery of body 2 with no radial breakthrough of body 2, thereby providing a firm backing support for the wedge members 7. This construction also provides a solid body 2 protection surrounding the internal parts so that these parts, including the master jaws, would be captivated by the chuck body in case of internal wreckage caused by wreckage of the machine incorporating the chuck or the like, thus enhancing operator safety.

Each wedge member 7 is provided with a generally T-shaped slot 8 within which is slidably received a complementarily T-shaped formation 4a that projects radially outwardly from each jaw member 4. The jaw members are slidably guided for radial movement in the chuck body 2, with the T-shaped slots sloped radially inwardly in the rearward direction. Due to this construction, rearward movement of the wedges 7 will simultaneously draw the jaws 4 radially outwardly, while forward movement of the wedges will drive the jaws radially inwardly. As the wedges move forwardly, not only do they move the jaws inwardly, but the degree to which they are supported by the wedges is progressively increased, thereby increasing the degree by which the jaws are radially supported by the solid material of the body 2 through the intermediary of the wedges 7.

Since the cylindrical openings 6 and wedges 7 provide for a firm backing support against high speed centrifugal forces, the invention not only assures reliable external gripping of workpieces, it also prevents excess gripping forces when the chuck is used to internally grip workpieces, such as thin walled pipe or the like. For internal workpiece gripping, auxialiary or modified jaws, of a type generally known, would be added to or substituted for the illustrated jaws 4.

To prevent dust from entering into the T-slots 8, as well as between the body 2 and the wedges and jaws, a dust cover 8A is provided at the forward end face of the body, to which it is secured by way of screws 9.

Figure 2:
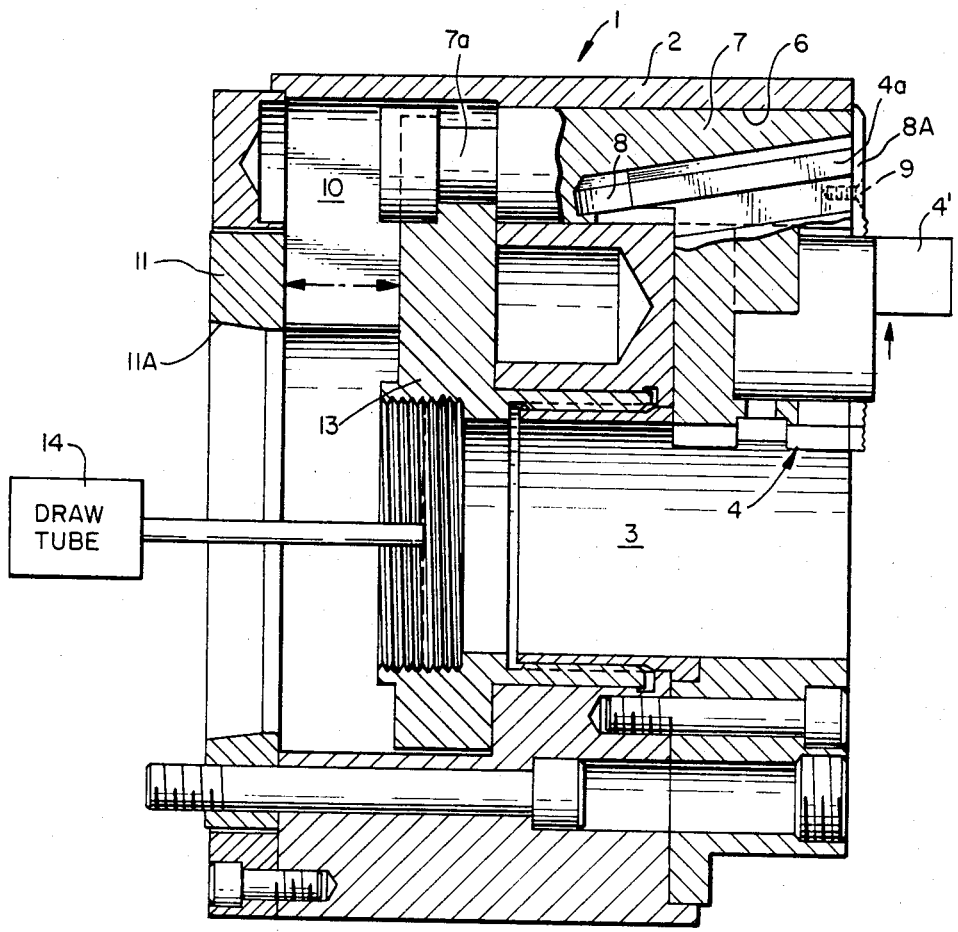
FIG. 2 is a cross-sectional view taken along line II—II of FIG. 1.
Figure 3:
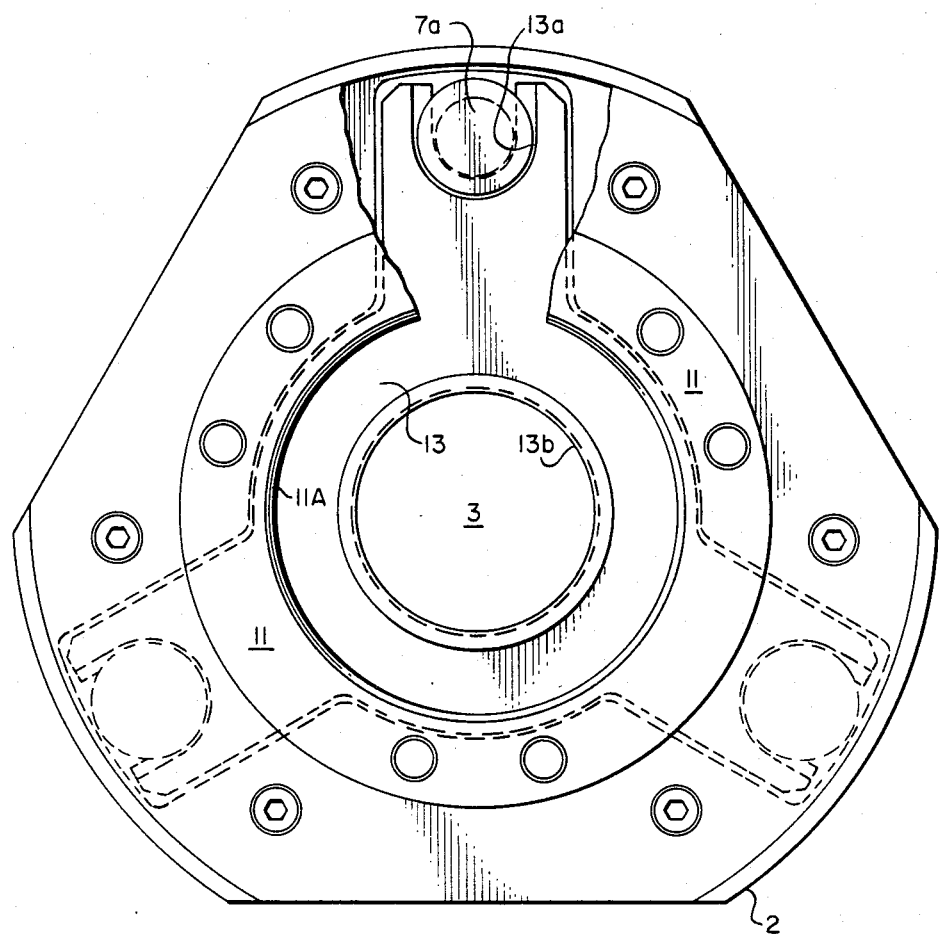
FIG. 3 is a rear face view of the chuck of FIG. 1, partially broken away to show the wedge actuation mechanism.

For actuation of the wedges, the rear ends thereof are provided with a bolthead-shaped projection 7a. The three bolt-shaped projections 7a of the three wedges 7 are interconnected by a generally Y-shaped spider 13, which, for this purpose, is provided with a U shaped cutout 13a that is designed to engage around the neck and under the head of the bolt-shaped projections 7a. Additionally, the spider 13 is provided with a threaded aperture 13b that is coaxially disposed with respect to aperture 3 of body 2. As schematically represented in FIG. 2, a draw tube 14 is threaded into engagement with the threads 13b of the spider 13. Thus, by hydraulic or pneumatic actuation of the draw tube, the spider 13 will be reciprocated rearwardly from the illustrated position, wherein the jaws are fully outwardly extended to their jaw-retracted position and vice versa, all of the jaws moving in unison.

The space 10, within which the spider 13 is reciprocated, is closed at the rear end of the body 2 by a closure plate 11. The closure plate 11 is provided with an aperture 11a which is coaxial with the apertures 3 and 13b. Furthermore, closure plate 11 also serves as a mounting plate by which the chuck 1 is adapted to be attached to a conventional machine tool, such as a lathe or the like.

While I have shown and described a single embodiment in accordance with the present invention, it is understood that the same is not limited thereto, but is susceptible of numerous changes and modifications as known to those skilled in the art, and I, therefore, do not wish to be limited to the details shown and described herein, but intend to cover all such changes and modifications as are encompassed by the scope of the appended claims.

What is claimed is:

1. An anti-centrifugal chuck for exteriorly gripping workpieces while rotating at high speeds, comprising:
   (a) a single, unitary body member;
   (b) a plurality of jaw bodies, including workpiece gripping jaw means attached thereto, radially-movably supported and guided at said body member, said body member including backing support portions disposed radially outwardly of each of said jaw bodies to provide backing forces resisting centrifugally induced radial outward jaw body movements during high speed rotation of the chuck;
   (c) a plurality of wedge members, each of which is received within a respective, complementarily-shaped, bore serving as a wedge member guideway in said body member, said wedge member being operatively connectd to a respective one of said jaws; and
   (d) actuator means, connected to said plurality of wedge members, for displacing same in unison between an axially rearwardly-retracted position wherein said jaws are withdrawn radially outwardly and axially forwardly displaced positions wherein said jaws are compressively displaced radially inwardly for gripping of a workpiece,
   wherein said wedge member guide ways are of sufficient axial extent to fully support the respective wedge members when in their axially forward positions.

2. An anti-centrifugal chuck according to claim 1, wherein said wedge members and the respective bores, within which they are received, are of a substantially circular cylindrical shape for radially and circumferentially distributing circumferential forces imposed on said jaws to said unitary body member.

3. An anti-centrifugal chuck according to claim 1, wherein the connection between said jaws and the respective wedge members comprises a T-slot formed axially along each wedge and T-shaped formations extending axially along each jaw and received in a respective one of the T-slots.

4. An anti-centrifugal chuck according to claim 3, wherein said actuating means comprises a generally Y-shaped spider connected at respective ends thereof to said wedge members and a draw tube for reciprocating the spider.

5. An anti-centrifugal chuck according to claim 4, wherein the connection between the spider and each of the wedge members is formed by a bolt-shaped formation on the end of each wedge member and a U-shaped slot formed at the end of each arm of the Y-shaped spider.

6. An anti-centrifugal chuck according to claim 4, wherein said body member, said spider, and a closure and mounting plate, which closes a chamber within which said spider reciprocates, are provided with coaxially-arranged throughapertures, said jaw members being disposed radially outwardly thereof.

7. An anti-centrifugal chuck according to claim 1, wherein said bores in said body member are disposed entirely radially inside the outer periphery of the body member with no radial breakthrough in said body member, whereby said body member effectively surrounds the internal master jaw components to thereby contain the same in the event of machine or chuck failure.

8. An anti-centrifugal chuck according to claim 1, wherein said chuck jaws include means for internally gripping a tubular or the like workpiece.

9. In a rotatable jaw chuck construction of the type having a body means formed of an inner sleeve-like body and an outer sleeve-like body, a plurality of jaw assemblies radially slideably supported in said inner sleeve-like body for gripping a workpiece, and axially-movable actuating wedges, each of which is axially slideably supported by the outer sleeve-like body and is in slideable camming engagement with a respective jaw assembly for causing radial displacement thereof in response to axial displacement of said wedge, the improvement wherein said inner sleeve-like body and said outer sleeve-like body are formed as a single, unitary body member, said wedge members being received in respective complementarily-shaped bores formed in said body member, and said wedge members are operable to radially inwardly displace said jaws into engagement with a workpiece under compression, said outer sleeve-like body including backing portions disposed radially outwardly of the wedge members to provide backing forces resisting centrifugally induced radial outward movement of the respective jaw assemblies during high speed rotation of the chuck construction, said backing portions being of sufficient axial length to fully support the respective wedge members at their axially forward positions.

10. A rotatable jaw chuck according to claim 9, wherein said wedge members and the respective bores, within which they are received, are of a substantially circular cylindrical shape for radially and circumferentially distributing circumferential forces imposed on said jaws to said unitary body member.

* * * * *